United States Patent
Kramp

(10) Patent No.: US 6,688,171 B2
(45) Date of Patent: Feb. 10, 2004

(54) FLEXIBLE CONTACT ELEMENT FOR CONTACTLESS SIGNAL ACQUISITION

(75) Inventor: Wolfgang Kramp, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/340,659

(22) Filed: Jan. 13, 2003

(65) Prior Publication Data

US 2003/0145653 A1 Aug. 7, 2003

(30) Foreign Application Priority Data

Jan. 11, 2002 (DE) .......................... 102 00 867

(51) Int. Cl.$^7$ ................................ G01F 23/12
(52) U.S. Cl. ........................................ 73/314
(58) Field of Search .................. 73/314, 312, 306, 73/317

(56) References Cited

U.S. PATENT DOCUMENTS 4,000,651 A * 1/1977 Christiansen ............... 73/314
4,536,660 A * 8/1985 Tetro .......................... 307/118
4,637,254 A * 1/1987 Dyben et al. ................ 73/314
4,951,506 A * 8/1990 Lew ............................ 73/314

* cited by examiner

*Primary Examiner*—Helen Kwok
*Assistant Examiner*—Katina Wilson
(74) *Attorney, Agent, or Firm*—Ronald E. Greigg

(57) ABSTRACT

A device for recording the fill level of a liquid inside a container in which an elongated, flexible tubular electrical contact element is arranged, one end area of which is provided with connections at which an electrical signal can be measured. Electrically conductive coatings are disposed on the inner surface of the contact element and facing towards one another, which coatings may be brought into contact with one another by means of a contact producing acquisition element which is disposed on the outside and is movable relative to the flexible contact element.

13 Claims, 2 Drawing Sheets

US 6,688,171 B2

FLEXIBLE CONTACT ELEMENT FOR CONTACTLESS SIGNAL ACQUISITION

BACKGROUND OF THE INVENTION

1. Field of the Invention

In the vast majority of cases, the fill level of liquids, e.g. fuel in a vehicle fuel tank, is still recorded using mechanical systems. In view of the increasingly widespread use of contactless signal acquisition systems, it would seem desirable to replace mechanical fill level recording systems with a contactless signal acquisition method not requiring physical contact.

2. Description of the Prior Art

Current devices for recording fill level generally utilize mechanical signal acquisition systems that function in cooperation with a potentiometer. In such cases, the potentiometer is disposed in the bottom area of a container that is intended to accommodate a liquid. However, the bottom of these containers is also where the lubricants and particles in the liquid collect and so come into direct contact with the potentiometer. As a result, particles may be deposited on the potentiometer, which is thus susceptible to corrosion and may suffer the effects of wear.

Particles that are deposited on the bottom of the vehicle's fuel tank are swirled as a result of the driving motion of the vehicle, but new particles or suspended particles and sources of abrasion may infiltrate the tank at each refueling, depending on the purity of the fuel, and may impair the functioning of the potentiometer, particularly the accuracy with which a slider contacts a coil that is normally conformed on the potentiometer.

In the case of stationary containers, deposited particles are not swirled because the driving motion that occurs with vehicles is absent, with the result that contaminants may build up quickly and have a corrosive effect on the potentiometer.

SUMMARY OF THE INVENTION

With the solution suggested according to the invention, the resiliency of contactless recording is increased significantly for the same effort in terms of signal acquisition. Since the principal of signal acquisition remains the same, the connection of the device suggested according to the invention does not entail substantial modification of the downstream analysis system. Additional effort that might be required in terms of electronic equipment if, for instance, a Hall probe or an optoelectronic analysis system were used, may therefore be disregarded. Moreover, the effort in respect of peripheral cleanliness is substantially reduced when a flexible contact element according to the suggested solution is used, which particularly favors use of such a contact element even in environments that present threats of heavy soiling and particles.

The motion device that is used—for example—in recording the level of fuel in a fuel tank may be retained in large part and does not need to be fundamentally modified. A flexible contact element in the form of a rod is used and may take the place of a slider that cooperates with a potentiometer. A magnetic head is arranged at one end of the rod-shaped, flexible contact element and is movable relative thereto. The float and the lever from known recording motion devices may be used in most cases. The motion is only transferred to a magnet, which may be used as a recording element, or to a pressure element. Depending on the method, the motion may be transferred magnetically or via a pressure element acting on a resistor track.

A particularly simple and elegant embodiment is achieved if the flexible contact element is mounted vertically inside a tube that may be accommodated in a container or may project thereinto. A magnetic element furnished with a float is movable relative to the flexible contact element according to the level of liquid in the tube. A coating of ferromagnetic material applied to the wall of the flexible contact element is brought into contact with a resistive coating that is applied to the inside wall of the flexible contact element opposite the ferromagnetic material by the magnet, thus creating a short circuit between the resistive coating and the ferromagnetic coating. The electrical signal produced in this manner may be measured for example at the ends of the flexible contact element.

The electrical signal reflects the liquid level of, for example, fuel in a vehicle's fuel tank.

When the fill level detection system according to the invention is used in stationary containers and in mobile containers, e.g. fuel tanks, brake fluid reservoirs, receptacles for windshield washer liquid or hydraulic fluid, other motion devices may be used instead of floats and may move the magnet or permanent magnet that replaces the slider relative to the flexible contact element—e.g. of a rubber hose containing one resistive and one ferromagnetic coating—that replaces the corresponding slider track. It is also possible to arrange the permanent magnet on an articulated rod, a toggle link or the like. If a magnet is arranged on such a motive system, it is also possible to create relative movement between the magnet and the flexible contact element.

In the case of horizontally disposed flexible contact elements, the float movement may be articulated to provide radial motion about a pivot point for example via a perpendicularly conformed lever arm. This causes the end of the rod that is furnished with a magnetic acquisition head to move radially along the contact hose. The distance of this movement is defined by the length of the rod to the pivot point. A horizontal hose alignment may also be selected instead of a radial hose alignment, in which case the only difference would lie in the proportion of the distances.

BRIEF DESCRIPTION OF THE DRAWINGS

The invention will be described more fully herein below, with reference to the drawings, in which.

DESCRIPTION OF THE PREFERRED EMBODIMENTS

Figure 1:
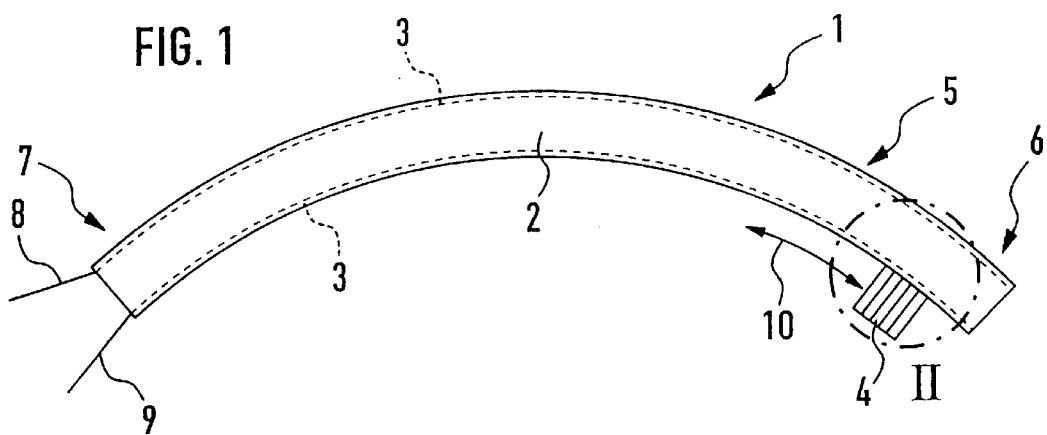
FIG. 1 shows a rod-shaped contact element having a permanent magnet movably disposed in the end area thereof.

FIG. 1 illustrates a rod-shaped contact element having magnets or permanent magnets which are disposed in the end area of the contact element and are movable relative thereto. The device is represented as a flexible, curved contact element 1. Rod-shaped contact element 1—possibly in the form of a hose—encloses a hollow space 2 that is defined by a wall 3. A signal acquisition unit 4 is arranged on the outside of the element and is movable along the container.

In a first end area 6 of flexible, rod-shaped contact element 1, hollow space 2 thereof is terminated by a base section, while in a second end area 7, flexible contact element 1 is open. In the illustration according to FIG. 1, wire ends 8 and 9 are shown in the second end area 7, which wires are used to conduct an electrical signal corresponding to the fill level of the liquid to be measured and via which the signal may be transmitted to a display or analysis instrument not shown here. Coatings are embedded in wall 3 of the contact element, which may be embodied for example, as a hose, which coatings generate an electrical signal that may be captured at first wire end 8 or at second wire end 9 depending on the position of contact producing acquisition element 4.

Figure 2:
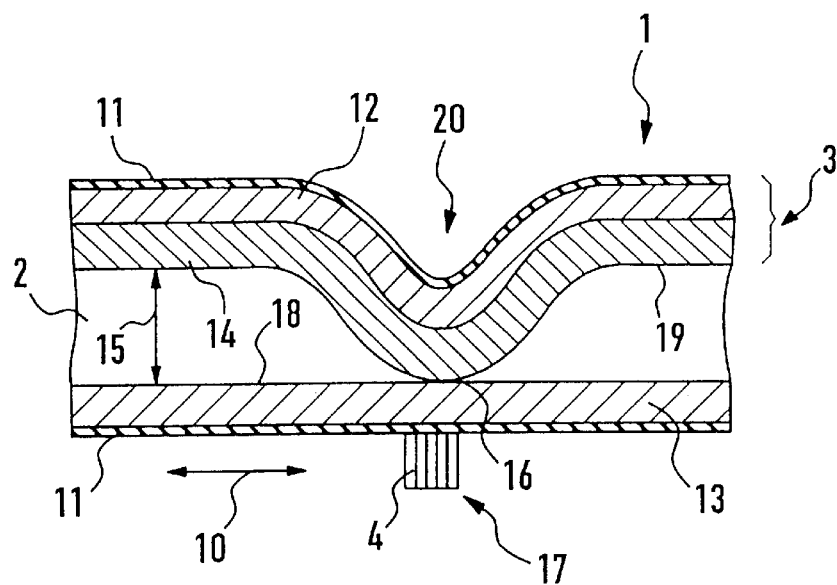
FIG. 2 is an enlarged sectional view of the end area of the rod-shaped contact element illustrating the construction coating inside the contact element.

FIG. 2 is an enlarged sectional view of an area of the rod-shaped, flexible contact element illustrating the coating construction of the wall of the contact element.

FIG. 2 is an enlarged illustration of a deformation 20 of the flexible, deformable contact element 1. Deformation 20 in an outer wall 11 of hose-type contact element 1 is caused by a magnetic head 4 that is movable relative to outer side 5 of the flexible contact element. Acquisition element 4 may have the form of an electromagnet or a permanent magnet and as shown in FIG. 2 assumes a position indicated with the number 17.

Wall 3 of deformable contact element 1 includes a first resistive coating 12 on one side. First resistive coating 12 is delimited outwardly by hose wall 11 of flexible contact element 1. Hose wall 11 protects the deformable, flexible contact element from external influences such as corroding agents that may be introduced by a liquid contained in the container; outer wall 11 also prevents the signal acquisition or contact producing element 4 from coming into direct contact with the coatings on wall 3 of deformable contact element 1 that act as strip conductors.

The illustration in FIG. 2 shows that a first resistive coating 12 is arranged on the inner surface of outer wall 11 of the deformable contact element. A coating of a ferromagnetic material 14 is disposed on first resistive coating 12 of the deformable contact element facing hollow space 2 of deformable contact element 1, such that the outer surface 19 thereof is positioned opposite to hollow space 2. A second resistive coating 13 is disposed facing coating 14 of ferromagnetic material, and upper or inner surface 18 thereof faces coating 14 of ferromagnetic material. Both first resistive coating 12 and second resistive coating 13 are enclosed by deformable outer wall 11 of flexible contact element 1. Contact is produced by acquisition element 4 in position 17 which is disposed in the area of outer wall 11 covering second resistive coating 13. Acquisition element 4, which may have the form of an electromagnet or a permanent magnet, is movable relative to deformable contact element 1 as indicated by the double-headed arrow indicated with the number 10.

When acquisition element 4 moves from position 17, a wall separation 15 is created between outer side 19 of ferromagnetic coating 14 and upper side 18 of second resistive coating 13. On the other hand, when acquisition element 4 is in position 17, the magnetic force generated forces outer side 19 of ferromagnetic coating 14 into contact with upper side 18 of second resistive coating 13. This then causes a short circuit at the point of contact 16 between second resistive coating 13 and ferromagnetic coating 14, so that an electrical signal may be produced which may be transmitted through the circuit including first wire end 8 and second wire end 9 (see illustration in FIG. 1) to an analysis instrument which is not shown in detail here. The electrical signal, which is generated at the respective position 17 of acquisition element 4 by the contact between coating 14 of ferromagnetic material and second resistive coating 13 corresponds to the position along the length of deformable contact element 1 in which acquisition element 4 is positioned by a moving apparatus or directly by the level of liquid within the container.

The fill level of the liquid, which is to be detected inside a container not shown in FIG. 2, is determined by the respective position 17 of acquisition element 4 on the outside of deformable contact element 1. Depending on the fill level in the container—not shown in FIG. 2—acquisition element 4 moves in the direction of double-headed arrow 10. Depending on the level of the liquid, a contact point 16 is established which follows the liquid level and is variable therewith, and moves along deformable contact element 1. An electrical output signal is obtained which is determined by contact point 16 and which may be transmitted via wire 8 or wire 9 of an analysis unit which is not shown in FIG. 2.

Acquisition element 4 in FIG. 2 is a contact producing a circuit completion unit which functions similarly to a slider, while the slider track corresponding thereto is represented by deformable contact element 1. There is no electrical contact between acquisition element 4 and the outwardly enclosed coatings 12, 13, and 14 of deformable contact element 1 through the element's outer wall 11; electrical contact is only established as a result of the magnetic or mechanical forces generated by acquisition element 4 to produce the electrical contact, and generates an output signal over the length of deformable contact element 1 that is electrically transmissible at wire ends 8 and 9. First resistive coating 12 and second resistive coating 13 are aligned parallel to one another on the inner surface of outer wall 11 of deformable contact element 1 and are joined in first end area 6 of deformable contact element 1 (see illustration in FIG. 1). At contact point 16 between inwardly directed surface 19 of ferromagnetic coating 14 and upper inwardly directed surface 18 of second resistive coating 13, only the resistance of the short-circuit produced by slider acquisition element 4 at the respective position has any effect; the overall resistance of the strip conductor tracks is reduced accordingly. The resistance at the respective contact point 16 enables the level of liquid in a container to be determined.

Figure 3:
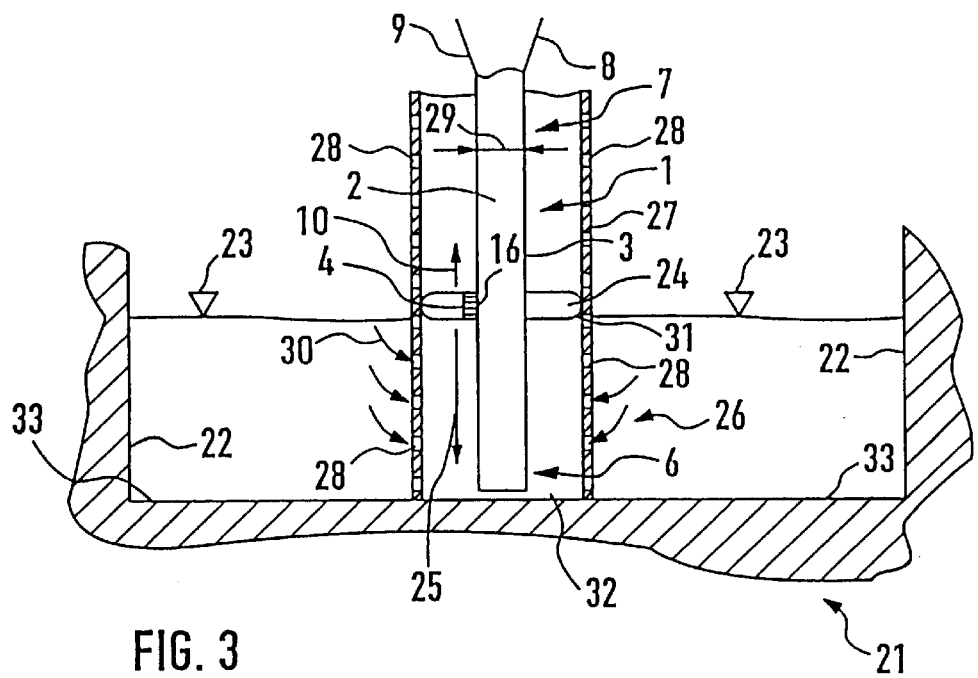
FIG. 3 shows the arrangement of a flexible contact element mounted vertically inside a vehicle fuel tank.

The illustration in FIG. 3 shows a variant form according to which a flexible contact element is mounted vertically inside a vehicle fuel tank.

A container 21—here a schematic representation of a vehicle's fuel tank—includes a container wall 22 and an container base that is designated with the number 33. A liquid—perhaps fuel in the present example—is contained in the container 21 and the liquid's fill level is indicated by the number 23. A deformable contact element 1 is installed vertically in container 21. The first end area 6 of deformable contact element 1 is situated above container base 33, and at the second end area 7 of deformable contact element 1 first wire end 8 and second wire end 9 are shown to be protruding from the deformable contact element. First wire end 8 and second wire end 9 are connected to an analyzer circuit which is used to analyze the electrical signals transmitted through wire ends 8 and 9.

In the illustration according to FIG. 3, deformable, for example hose-type contact element 1 is enclosed in a tubular member 26 arranged for example coaxially with deformable contact element 1 on container base 33. Tubular member 26 includes a lateral surface 27, which in turn may be furnished with individual apertures 28 on its circumference over the entire vertical length. An annular gap is formed between the inner side of lateral surface 27 of tubular member 26 and outer side 5 of deformable contact element 1, which gap is filled with the liquid whose fill level 23 is to be recorded. The liquid inside container 21 enters the cavity between lateral surface 27 and the outer side of deformable contact element 1 through apertures 28. The flow of liquid from container 21 into the interior of tubular member 26 is indicated by the arrows numbered 30. Accordingly, the liquid in the annular gap between the inner side of lateral surface 27 and the outer side of deformable contact element 1 reaches a level that is exactly the same as the liquid level 23 in container 21.

A float element 24 is included in the vertically installed deformable contact element 1. Float element 24 is vertically movable relative to deformable contact element 1 and relative to lateral surface 27 of tubular member 26, according to the level reached by the liquid that is in the annular gap between lateral surface 27 and the outer side of deformable contact element 1. Acquisition element 4—in the form of a magnet or even a permanent magnet—may be integrated in float element 24 in such manner that it directly opposes outer wall 11 of deformable contact element 1. In order to prevent tipping or tilting and thereby also a false reading of the actual liquid level 23, float element 24 is provided with a convex bevel. As the liquid level is established in the annular gap between flexible contact element 1 and the inner side of lateral surface 27, float element 24 either moves in direction 10 or, in the case of liquid level 23 in container 21, in the direction indicated by downward arrow 25. As a result, float element 24 with integral acquisition element 4 is displaced in accordance with the level of liquid in the annular gap between deformable contact element 1 and lateral surface 27 of tubular member 26. In the variant shown in FIG. 3, contact point 16, which is shown enlarged in FIG. 2, in hollow space 2—not shown in FIG. 3—of deformable contact element 1 is adjusted in accordance with the position of acquisition element 4 and thus also with the position of float element 24. A deformation of outer wall 11 of deformable contact element 1 is created in the area of position 17 of acquisition element 4, which deformation is indicated in FIG. 2 by the number 20, thereby causing a point of contact 16 in hollow space 2 thereof between ferromagnetic coating 14 and second resistive coating 13. Contact point 16 serves to create a short-circuit loop, whose resistance value may be transmitted to an analyzer as an electrical output signal via wire ends that are numbered 8 and 9 in FIG. 3. The level of the liquid 23 in container 21 may be determined on the basis of the electrical signal generated by the creation of contact point 16 corresponding to the position of acquisition element 4 along the length of deformable contact element 1. Diameter 29 of deformable contact element 1 is selected to ensure sufficient distance 15 between outer side 19 of ferromagnetic coating 14 and second resistive coating 13 in the areas that acquisition element 4 does not currently occupy opposite the outer side of deformable contact element 1. On the other hand, the size of diameter 29 of deformable contact element 1 is selected to ensure that outer side 19 of ferromagnetic coating 14 and upper side 18 of second resistive coating 13 are brought into contact at exactly the position relative to deformable contact element 1 currently occupied by acquisition element 4 on the basis of liquid level to be recorded.

Instead of being disposed inside a float element 24, acquisition element 4 may also be attached to a lever that is affixed in articulated manner on container wall 22 of container 21. The lever itself may be attached to a float element so that it also responds to a rise or fall in the liquid level in container 21.

Besides applications entailing direct contact between the sliders (acquisition element 4) and the slider tracks (resistive coating 13, ferromagnetic coating 14) to determine fill levels in vehicle fuel tanks, the proposed invention further enables fill levels to be determined in windshield washer bottles, brake fluid reservoirs, hydraulic fluid containers, or in laboratory vessels designed for liquids containing substances in suspension. It is possible to determine the fill levels of oil tanks, water tanks or other containers that hold liquids. Depending on the nature of the motion device inside the container, it might also be possible to bring second resistive coating 13 and a ferromagnetic coating 14 into contact inside hollow space 2 of deformable contact element 1 through a fill level of the liquid that is detected in container 21 if a rod-shaped element on outer side 11 of deformable contact element 1 exerts pressure thereon, thus causing a contact point 16 between coatings 13, 14 on the inside of wall 3 of deformable contact element 1.

Figure 4:
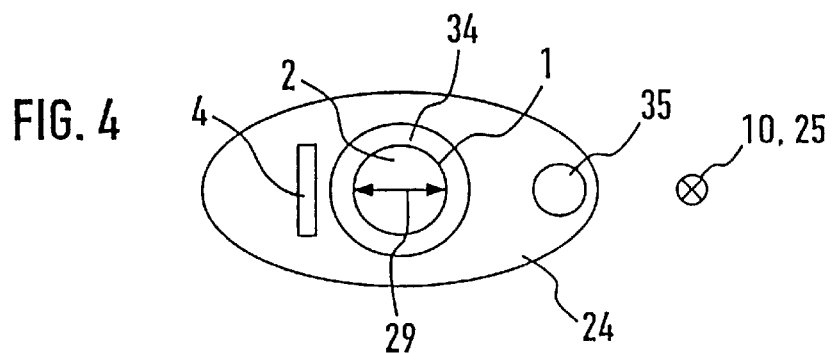
FIG. 4 is a plan view of a float element with signal acquisition element included.

FIG. 4 shows a top view of a float element that is upwardly and downwardly displaceable along the deformable contact element 1 shown in FIG. 3.

Float element 24 as shown in FIG. 4 is movable perpendicularly to the plane of the drawing in directions 10 and 25 depending on liquid level 23. In order to guide float element 24 in the vertical plane and to prevent it from becoming misaligned with respect to the axis of deformable contact element 1, float element 24 may include a float guide 35, along which float element 24 may move upwards and downwards. In order to assure unimpeded vertical movement in directions 10 and 25, an annular air gap 34 may also be provided between float element 24 and outer side 5 of deformable contact element 1, thereby preventing friction between the inner side of float element 24 and the outer side 5 of deformable contact element 1. This assures that the float unit may move without hindrance in response to liquid level 23 inside a container 21, such as a vehicle fuel tank. As in the representation of deformable contact element 1 in FIG. 3, the internal diameter of deformable contact element 1 is indicated by the number 29.

Figure 5:
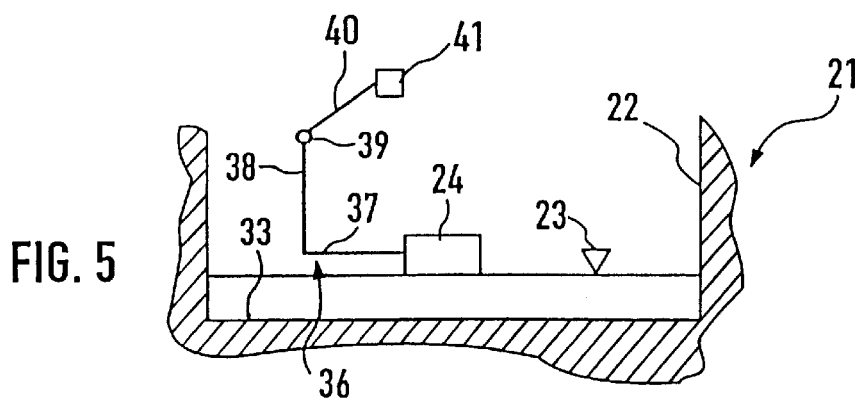
FIG. 5 is the variant form of a contactless fuel tank level signal acquisition device using an articulated lever.

The illustration in FIG. 5 further shows a variant form of the deformable contact element that may be installed horizontally in a container 21. According to this solution, the movement of float 24 is articulated to move radially about a pivot point 39 by a transmission lever, represented here as a right-angled lever 36, so that the end of a compression bar 40 moves radially along the deformable contact element, which here has the form of a contact hose. An acquisition element 4, for example in the form of a magnetic head, may be disposed at the end of compression bar 40, so that it is movable radially along the deformable contact element. The distance of this movement is defined by the length of compression bar 40 to pivot point 39. Instead of a radial hose guide, which is similar to the guide for a potentiometer track, a horizontal hose guide, i.e. a guide for a deformable contact element 1 that extends radially may also be implemented. In this variant form, the only difference consists in the proportion of the distances, which however is known from the geometrical dimensions and may be accounted for in a contactless fill level measurement system realized in this way. In this variant form (see the illustration in FIG. 5) a magnetic head may be used as the acquisition element 4 on compression bar 41.

The foregoing relates to a preferred exemplary embodiment of the invention, it being understood that other variants and embodiments thereof are possible within the spirit and scope of the invention, the latter being defined by the appended claims.

I claim:

1. A device for recording the fill level (23) of a liquid inside a container (21) comprising an elongated, flexible tubular electrical contact element (1) arranged in the container and having electrical connection (8, 9) at one end (7) thereof at which connection an electrical signal is measurable, electrically conductive coatings (13, 14) disposed on an inner surface of the contact element (1) and normally spaced from one another, an acquisition element (4, 41) disposed on the outside (5) of the contact element (1), the acquisition element (4, 41) being movable along the contact element (1) in response to changes in the liquid level to bring the electrically conducting coatings into contact with one another, wherein the electrically conducting coatings (13, 14) comprise a resistive coating (13) and a ferromagnetic coating (14).

2. The device according to claim 1, further comprising a resistive coating (12) disposed between the ferromagnetic coating (14) and the outer wall (11) of the flexible tubular contact element (1).

3. The device according to claim 1, wherein the outer wall (11) of the flexible contact element (1) is deformable.

4. The device according to claim 1, wherein the outer side (19) of the ferromagnetic material coating (14) and the upper side (18) of the resistive coating (13), which is normally spaced from the ferromagnetic coating (14), produce a conductive track contact (16) at the respective position (17) of the acquisition element (4).

5. The device according to claim 1, further comprising a tubular guide member (26) surrounding the contact element (1) in the container (21) in which the liquid fill level (23) is to be recorded.

6. The device according to claim 5, wherein the tubular guide member (26) encloses the flexible contact element (1) so as to create an annular gap therebetween.

7. The device according to claim 5, wherein the lateral surface (27) of the tubular member (26) is furnished with apertures (28) that enable the liquid to flow into the interior of the tubular member (26).

8. The device according to claim 5, further comprising a float (24) attached to the acquisition element (4), which float surrounds the flexible contact element (1) and which is guided vertically (10, 25) inside the tubular member (26).

9. The device according to claim 1, wherein the acquisition element (4) is in the form of a magnetic head (41) attached to a pivot element (40) movable about a pivot point (39), the pivot element (40) and acquisition element (4) functioning together via a lever arrangement (36) that is operated by the float element (24).

10. The device according to claim 9, where the lever element (36) has the form of a right-angled lever, which includes a first lever arm (37) and a second lever arm (38).

11. The device according to claim 10, wherein the float element (24) is movably attached in jointed manner to the first lever arm (34).

12. The device according to claim 9, wherein the acquisition element (4) has the form of a magnetic head (41) and is attached to the end of the compression bar (40), and moves radially over the deformable contact element which has the form of a contact hose.

13. The device according to claim 1, wherein the flexible contact element (1) is installed vertically in container (21).

* * * * *